United States Patent
Singhal et al.

(10) Patent No.: US 11,481,356 B2
(45) Date of Patent: Oct. 25, 2022

(54) TECHNIQUES FOR PROVIDING CLIENT INTERFACES

(71) Applicant: EMC IP Holding Company LLC, Hopkinton, MA (US)

(72) Inventors: Maneesh Singhal, Bangalore (IN); Adarsh Pradhan Jmt, Bangalore (IN); Jharanabala Nayak, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/934,171

(22) Filed: Jul. 21, 2020

(65) Prior Publication Data
US 2022/0027310 A1    Jan. 27, 2022

(51) Int. Cl.
*G06F 16/11*    (2019.01)
*H04L 61/50*    (2022.01)
*H04L 67/01*    (2022.01)
*H04L 101/622*    (2022.01)

(52) U.S. Cl.
CPC ............ *G06F 16/122* (2019.01); *H04L 61/50* (2022.05); *H04L 67/01* (2022.05); *H04L 2101/622* (2022.05)

(58) Field of Classification Search
CPC ... G06F 16/122; H04L 61/20; H04L 61/6022; H04L 67/42
USPC ........................................................ 707/781
See application file for complete search history.

(56) References Cited

U.S. PATENT DOCUMENTS

| 10,079,711 | B1 * | 9/2018 | Hayes | ................... H04L 61/10 |
| 10,496,282 | B1 * | 12/2019 | Martin | ................... G06F 3/061 |
| 2010/0162241 | A1 * | 6/2010 | Koma | ............... H04L 29/12839 |
| | | | | 718/1 |
| 2014/0040440 | A1 * | 2/2014 | Christopher | ........ H04L 61/6022 |
| | | | | 709/220 |
| 2017/0075845 | A1 * | 3/2017 | Kopparthi | ........... G06F 13/4027 |
| 2017/0235507 | A1 * | 8/2017 | Sinha | ...................... G06F 21/78 |
| | | | | 711/114 |

OTHER PUBLICATIONS

Makam, Sreenivas, Macvlan and IPvlan basics, May 29, 2016, https://sreeninet.wordpress.com/2016/05/29/macvlan-and-ipvlan/ (Year: 2016).*

DELLEMC, "DELL EMC Embedded NAS Technical Overview," Technical Note, May 2018.

* cited by examiner

*Primary Examiner* — James E Springer
(74) *Attorney, Agent, or Firm* — EMC IP Holding Company LLC

(57) ABSTRACT

Techniques for providing client interfaces may include: configuring a plurality of file server applications, wherein each of the plurality of file server applications is associated with a different one of a plurality of virtual network devices, wherein each of the plurality of virtual network devices is bound to a different one of a plurality of unique MAC (media access control) addresses; binding the plurality of virtual network devices to a second network device; and exposing the plurality of virtual network devices directly on a network using the plurality of unique MAC addresses, wherein each of the plurality of virtual network devices exposes an associated one of the plurality of file server applications directly on the network to one or more clients.

20 Claims, 13 Drawing Sheets

TECHNIQUES FOR PROVIDING CLIENT INTERFACES

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). The storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which PO operations between an application and a physical storage device can be performed may be considered an I/O path between the application and the physical storage device. These I/O paths collectively define a connectivity of the storage network.

SUMMARY OF THE INVENTION

In accordance with one aspect of the techniques herein is a method, system, and computer readable medium for providing client interfaces comprising: configuring a plurality of file server applications, wherein each of the plurality of file server applications is associated with a different one of a plurality of virtual network devices, wherein each of the plurality of virtual network devices is bound to a different one of a plurality of unique MAC (media access control) addresses; binding the plurality of virtual network devices to a second network device; and exposing the plurality of virtual network devices directly on a network using the plurality of unique MAC addresses, wherein each of the plurality of virtual network devices exposes an associated one of the plurality of file server applications directly on the network to one or more clients.

In at least one embodiment, the second network device may be a physical network device. The physical network device may be a front end (FE) port of a data storage system, and wherein the data storage system may send and receive communications over the FE port. The second network device may be a bond network device. The bond network device may represent a plurality of physical network devices that are logically bonded as the bond network device. Each of the plurality of physical network devices of the bond network device may be a different FE port of a data storage system, and wherein the different FE port may connected to the network that is external with respect to the data storage system.

In at least one embodiment, the one or more clients may be connected to the network and communicate with a data storage system over the network. The data storage system may include the plurality of file server applications, the plurality of virtual network devices, and the second device. The one or more clients may include a host, and processing performed may include: sending, over the network, a first communication from the host to a first file server application of the plurality of file server application, wherein the first message includes a first MAC address of the plurality of unique MAC addresses, where the first MAC address is bound to a first of the plurality of virtual network devices associated with the first file server application of the plurality of file servers; receiving the first communication at the second device of the data storage system; and sending the first message from the second device to the first virtual network device that has the first MAC address and that is associated with the first file server application.

In at least one embodiment, 9 at least the first file server application may include one or more NAS (network attached storage) servers each supporting a plurality of file system protocols. Each of the one or more NAS servers may include a plurality of file servers supporting the plurality of file system protocols. The plurality of file servers may include a CIFS (Common Internet File System) file server, an NFS (Network File System) file server, and a pNFS (Parallel NFS) file server. The plurality of file server applications may run on a plurality of processing nodes. The plurality of processing nodes may be a plurality of virtual machines, and wherein the plurality of file server applications may be emulated virtualized instances executing in a context of the plurality of virtual machines. Each of the one or more NAS servers may be an emulated NAS server executing as a virtualized instance in a context of a virtual machine. The plurality of unique MAC addresses may be utilized at a data link layer of a network or telecommunications runtime stack. The bond network device may be configured in a fail safe networking mode. The bond device may be configured in a link aggregation mode.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations.

Figure 1:
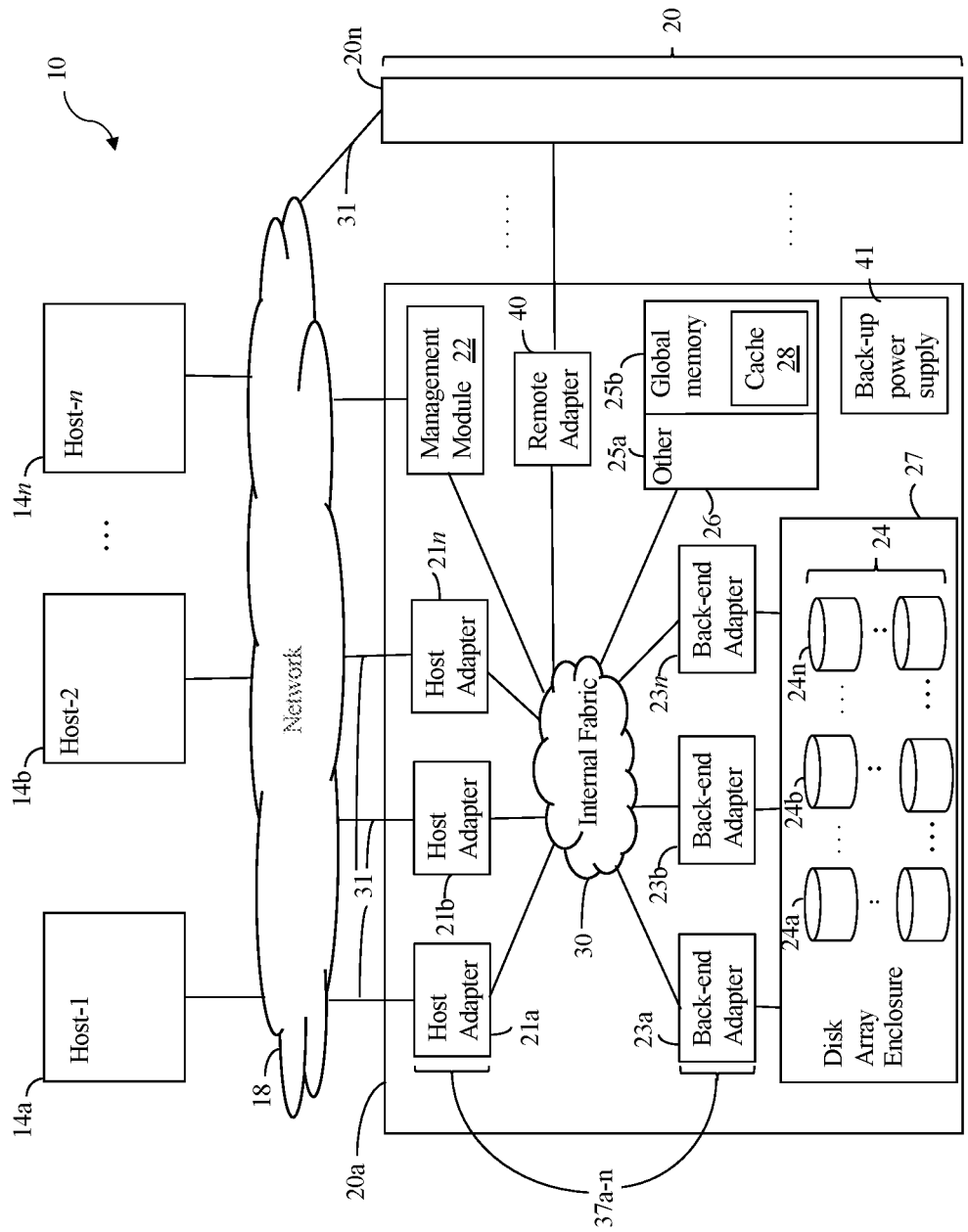
FIG. 1 is a block diagram illustrating an example of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. The BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEs 23a-n, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BE.

It should be noted that, although examples of techniques herein may be made with respect to a physical storage system and its physical components (e.g., physical hardware for each RA, BE, FA and the like), the techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

Figure 2A:
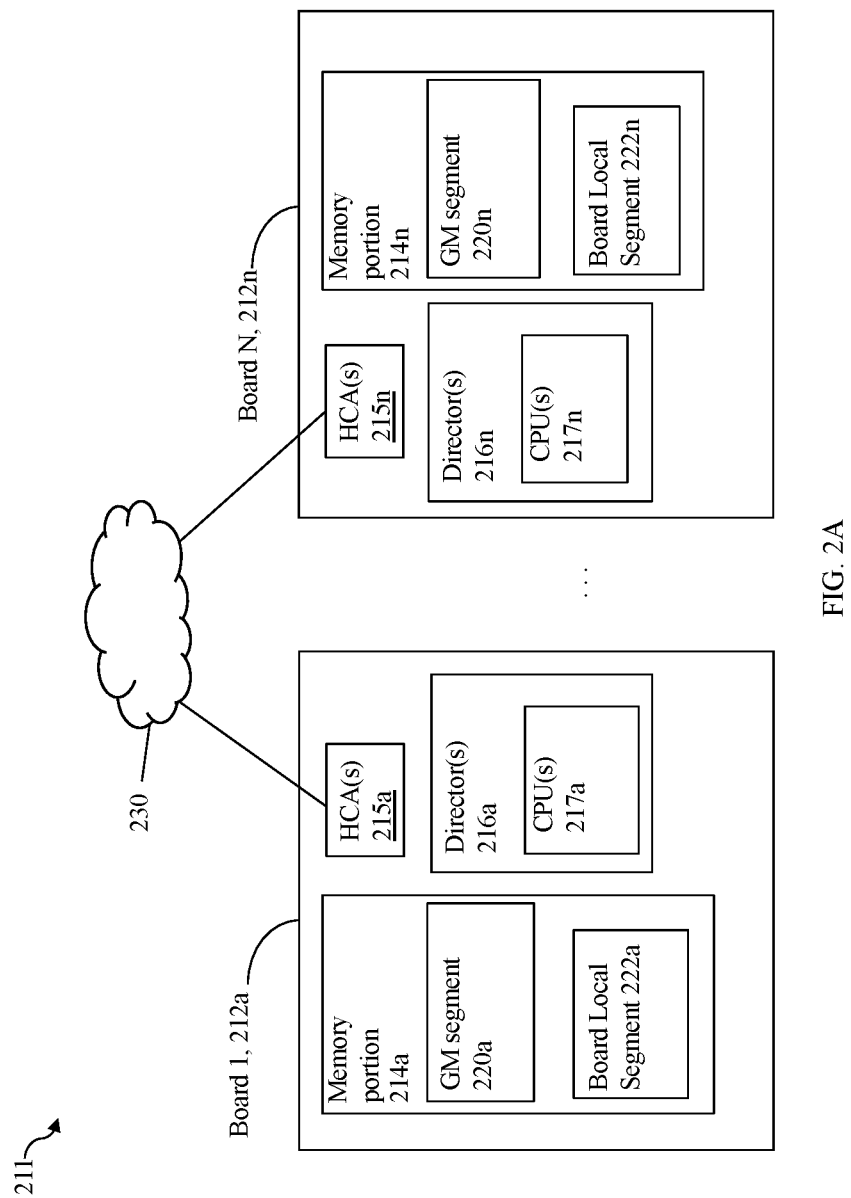
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BE, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
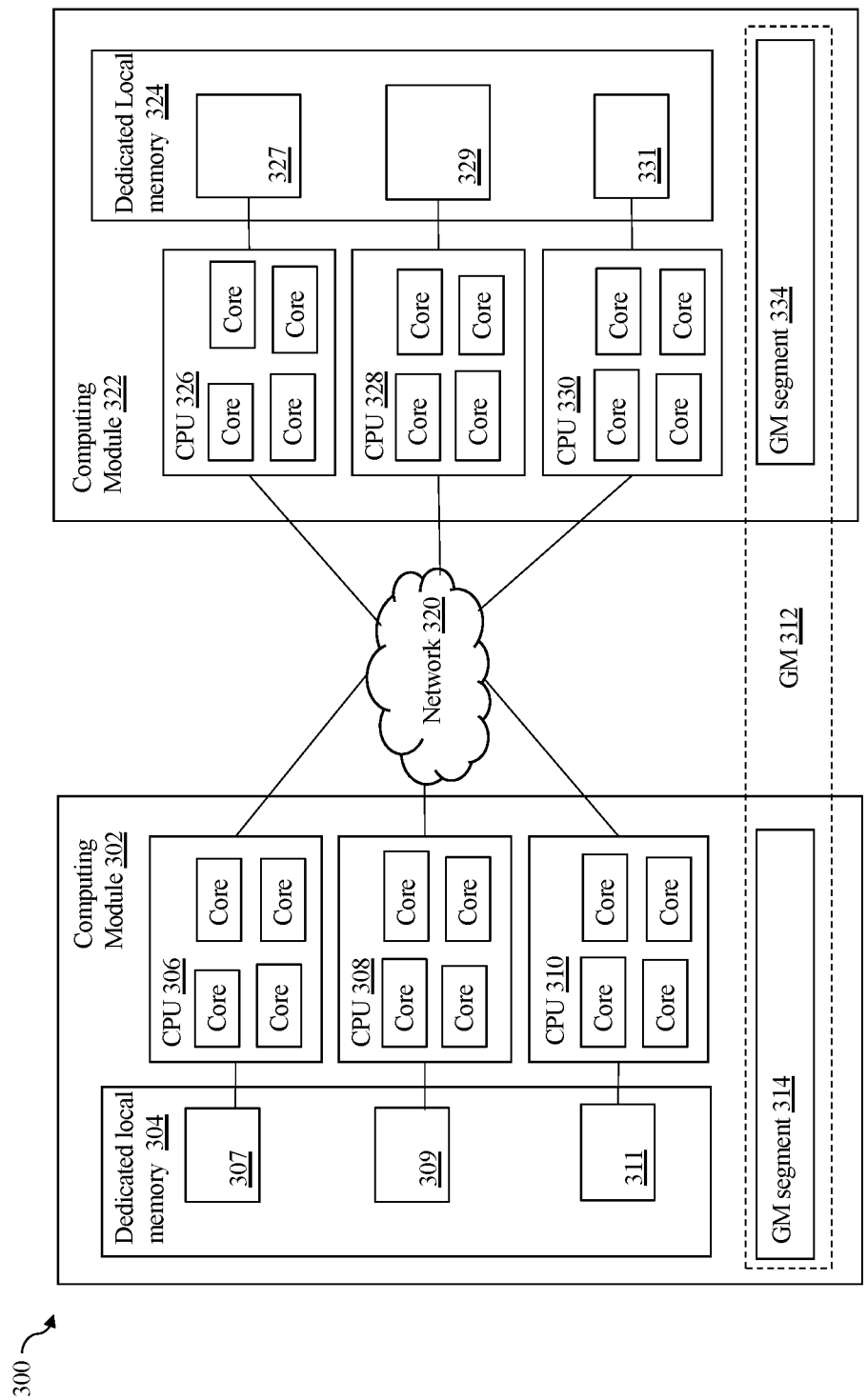
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
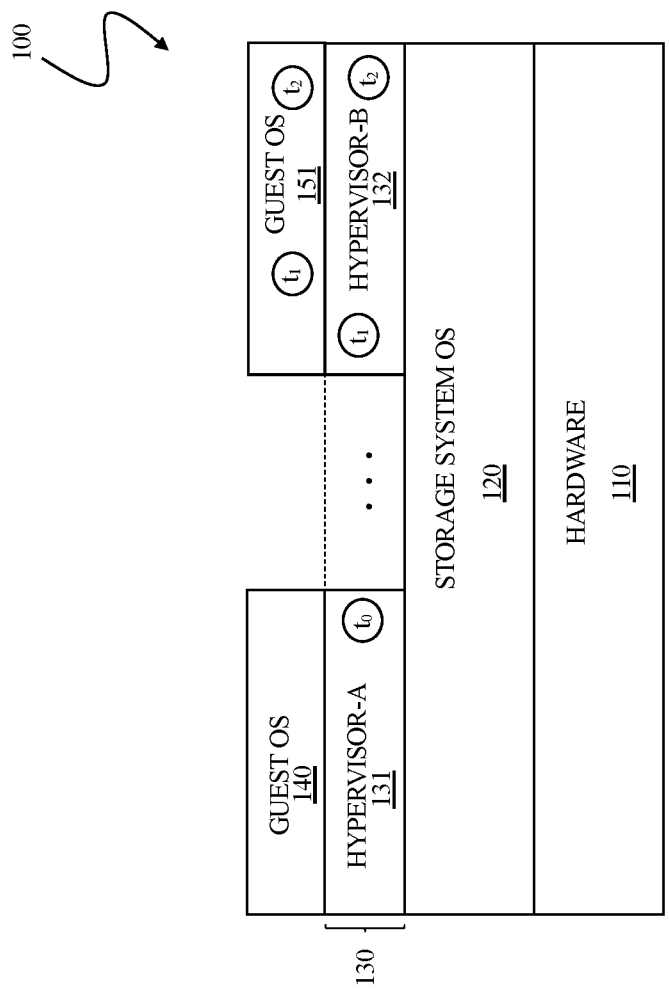
FIG. 3 is a schematic illustration showing hardware and software layers for a storage system, including independent hypervisors as threads, according to an embodiment of the system described herein.

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component of a storage system, for example, an FA, BE or DS. More generally, one or more of the CPUs 306, 308, 310, 326, 328 and 330 may be configured (e.g., hardwired, hardcoded or programmed) as a functional component of a storage system, for example, an FA, BE or DS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEs also have the necessary backend interfaces, such as interfaces to the various backend non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Referring to FIG. 3, a schematic illustration showing hardware and software layers for a storage system 100, such as the storage systems 20a-n discussed elsewhere herein. The storage system 100 has independent hypervisors as threads, which are described in more detail elsewhere herein. A hardware layer 110 includes hardware components for the storage system 100, such as memory and processors (CPUs) and/or other components like that discussed in connection with FIGS. 1, 2A and 2B. A storage system operating system (OS) layer 120 is shown as the operating system for the storage system 100. In an embodiment, the OS layer 120 may be a Symmetrix storage system OS, such as Enginuity, with a Symm/K kernel that provides OS services and scheduling. Other operating systems may be used, such as the Linux operating system.

An instance is a single binary image of an OS that performs a specific set of operations. In an embodiment, there may be up to eight instances configured on a director board at any given time. A thread is a separately schedulable set of code or process of an instance. Threads may be co-operative and/or preemptive, and may be scheduled by the OS. An instance may run on more than one core, that is, an instance may provide a symmetric multiprocessing (SMP) environment to threads running within the instance.

According to at least one embodiment of the system described herein, a thread may be provided that runs as a hypervisor within the storage system OS environment. Consistent with other discussion herein, a hypervisor is a software implementation providing a software virtualization environment in which other software may run with the appearance of having full access to the underlying system hardware, but in which such access is actually under the complete control of the hypervisor. The hypervisor running as the OS thread is a container hypervisor. The container hypervisor may manage a virtual hardware environment for a guest operating system (Guest OS), and, in an embodiment, the container hypervisor may run multiple OS threads (e.g., 1 to N threads) within a single instance. The Guest OS is an operating system that may be loaded by a thread of the container hypervisor, and runs in the virtual environment provided by the container hypervisor. The Guest OS may also access real hardware devices attached to a director board using a virtual device provided by the container hypervisor or via a peripheral component interconnect (PCI) pass-through device/driver. There may be multiple container hypervisors running within a single instance at the same time. There may also be multiple container hypervisors running within different instances on the same director board at the same time.

In FIG. 3, a hypervisor layer 130 is shown as including hypervisor-A 131 and hypervisor-B 132 that may be examples of container hypervisors in accordance with the system described herein. Each of the container hypervisors 131, 132 may run as threads embedded within the storage system OS operating environment (the storage system OS 120). The container hypervisor 131 is shown running as a thread t0 and may be running independently of the container hypervisor 132. The container hypervisor 132 is shown running two threads t1 and t2. These threads may run independently of each other as well as the thread t0 of the container hypervisor 131. In each case, the threads t0, t1 and t2 of the container hypervisors 131, 132 may run as threads of one or more instances of the storage system OS 120. For example, in an embodiment, the container hypervisors 131, 132 may be threads running as part of an Enginuity instance or a Linux instance. The container hypervisors 131, 132 may be scheduled like any other thread and may be preempted and interrupted as well as started and stopped. Advantageously, since the container hypervisors 131, 132 runs as threads within the storage system OS environment, physical resource sharing of the underlying hardware is already provided for according to the storage system OS scheduling.

According to an embodiment of the system described herein, a Guest OS 140 is loaded using the thread t0 of the container hypervisor-A 131 and, for example, runs an application in the virtual environment provided thereby. As shown, a Guest OS 151 may be loaded using independent threads t1, t2 of the container hypervisor 132. As further discussed elsewhere herein, threads t0, t1 and t2 may all be run independently of each other. The ability to run a container hypervisor as a storage system OS thread provides that the storage system 100 may run with no performance penalty until the container hypervisor thread is enabled. Even when the hypervisor thread is enabled and running an application in a Guest OS, the performance impact may be controlled. Additionally, developments in physical hardware may be accommodated through a software development process that is decoupled from modifications to the hypervisor code. Accordingly, releases of new storage system code, hypervisor code and Guest OS, and applications code may all be realized in an independent manner.

In various embodiments, the container hypervisors 131, 132 may each provide for one or more of the following features: boot a Guest OS; run the Guest OS as a storage system OS thread (e.g., Symm/K); be scheduled, preemptable, etc.; reset the Guest OS without restarting the instance; allow the Guest OS to access storage systems (e.g., Symmetrix) using a Cut-through Device (CTD); and allow the Guest OS to access the I/O Modules using a PCI pass-through device.

Figure 4:
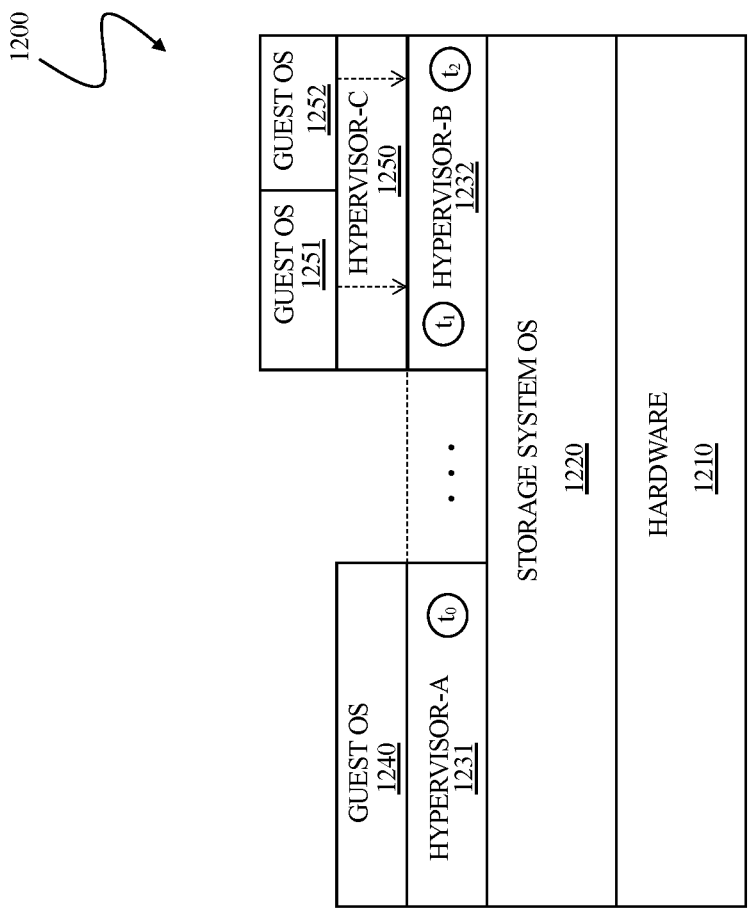
FIG. 4 is a schematic illustration showing a storage system with nested hypervisors according to another embodiment of the system described herein.

Referring to FIG. 4, a schematic illustration shows a storage system 1200 with nested hypervisors. The storage system 1200 is similar to the storage system 100 discussed elsewhere herein which may include a hardware layer 1210 and a storage system OS layer 1220. A Guest OS 1240 may be loaded using the thread t0 of a container hypervisor (hypervisor-A) 1231. As shown in connection with a container hypervisor (hypervisor-B) 1232, the container hypervisor 1232 may host one or more other hypervisors (hypervisor-C 1250). In various embodiments, the hypervisor-C 1250 may be another container hypervisor and/or may be another type of hypervisor, such as an ESXi hypervisor from VMware, Inc. of Palo Alto, Calif. The ability to host another hypervisor (hypervisor-C 1250), as a nested hypervisor, provides the capability of the system 1200 to host any guest operating system, such as Guest OS's 1251, 1252 (e.g., Linux) that may be hosted by the hypervisor 1250 (e.g., ESXi) itself without needing to modify the code of the container hypervisor 1232. It is noted that additional layers of hypervisors may further be nested in accordance with the system described herein. By embedding hypervisors within hypervisors in a storage system environment in the manner according to the system described herein, physical resource sharing may be provided using the storage system OS scheduling and, thereby, resource trampling that may occur with the addition of another hypervisor, without such system OS scheduling, is avoided.

Figure 5:
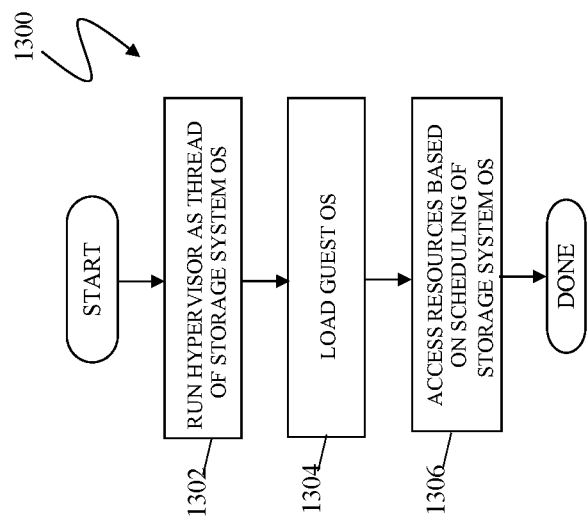
FIGS. 5, 6 and 12 are flowcharts of processing steps that may be performed in an embodiment in accordance with the techniques herein.

Referring to FIG. 5, a flow diagram 1300 shows processing for operating a hypervisor and a Guest OS according to various embodiments of the system described herein. At a step 1302, a container hypervisor is run as a thread of an underlying OS, for example, a storage system OS, such as Enginuity with Symm/K operating a Symmetrix storage system or the Linux operating system. After the step 1302, processing proceeds to a step 1304 where a Guest OS is loaded using the container hypervisor based on the thread of the storage system OS. The container hypervisor may be run independently of the Guest OS and independently of other hypervisors running as other threads of the storage system OS. After the step 1304, processing proceeds to a step 1306 where the hypervisor accesses resources according to a scheduler of the storage system OS and in connection with resource requirements of the Guest OS (and/or an application of the Guest OS). As further discussed elsewhere herein, the hypervisor may share resources with the other hypervisors according to the scheduling of the storage system OS. In an embodiment, the container hypervisor may be embedded with the storage system OS. As further discussed elsewhere herein, code of container hypervisor may be modified independently of code of the Guest OS and/or code of other hypervisors running as threads of the storage system OS. After the step 1306, processing is complete. One or more of the above-noted processing steps may be implemented via executable code stored on a non-transitory computer readable medium and executable by at least one processor according to an embodiment of the system described herein.

Figure 6:
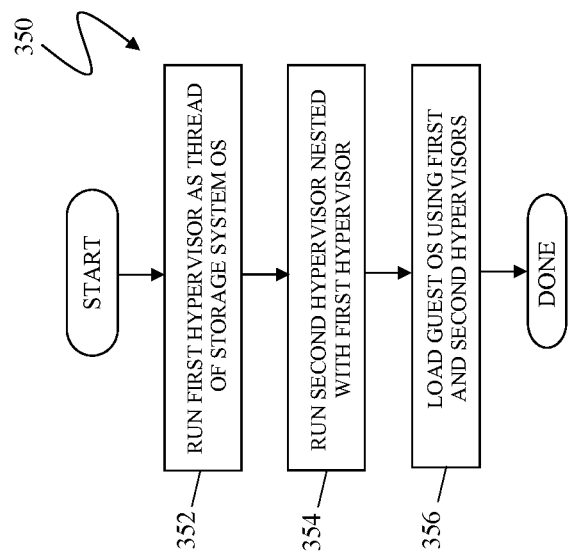

Referring to FIG. 6, a flow diagram 350 shows processing for operating nested hypervisors according to an embodiment of the system described herein. At a step 352, a container hypervisor (e.g., a first hypervisor) is run as a thread of an underlying OS, for example, a storage system OS, such as Enginuity with Symm/K operating a Symmetrix storage system. After the step 352, processing proceeds to a step 354, where a second hypervisor is run nested, and/or embedded within, the first hypervisor (the container hypervisor). In various embodiments, the second hypervisor may be a known hypervisor (e.g., ESXi) and/or may be another container hypervisor. Other hypervisors may be further nested in accordance with the system described herein. After the step 354, processing proceeds to a step 356, where a Guest OS is loaded using the first (container) hypervisor and the second hypervisor. After the step 356, processing is complete. One or more of the above-noted processing steps may be implemented via executable code stored on a non-transitory computer readable medium and executable by at least one processor according to an embodiment of the system described herein.

According to at least one embodiment, by using a thread of a container hypervisor in the storage system OS environment (e.g., Enginuity running Symm/K), it is possible for a Guest OS to operate in several modes. The container hypervisor thread may inherit the same number of CPU cores as that of the OS instance and may run as a single thread on those cores when active. However, since the container hypervisor is running as a thread, rather than being scheduled as an OS instance, as described elsewhere herein, other OS threads may also continue to run on other cores in the same SMP environment. The use of the OS scheduling algorithms (e.g., Symm/K) for scheduling the threads of the container hypervisors thus provide the ability to schedule fractions of CPU time on multiple cores for the Guest OS's. Furthermore, it is possible for the container hypervisor to allocate fewer virtual cores than physical cores available to the instance, and allow the Guest OS to operate SMP on those cores while still allowing other OS threads to operate with full CPU core resources, and to adjust the CPU allocation between Guest OS's and other threads. In an embodiment, in a VMAX system from Dell EMC, the granularity of the CPU time scheduling according to the system described herein may be on the order of 500 microseconds or less.

Figure 7:
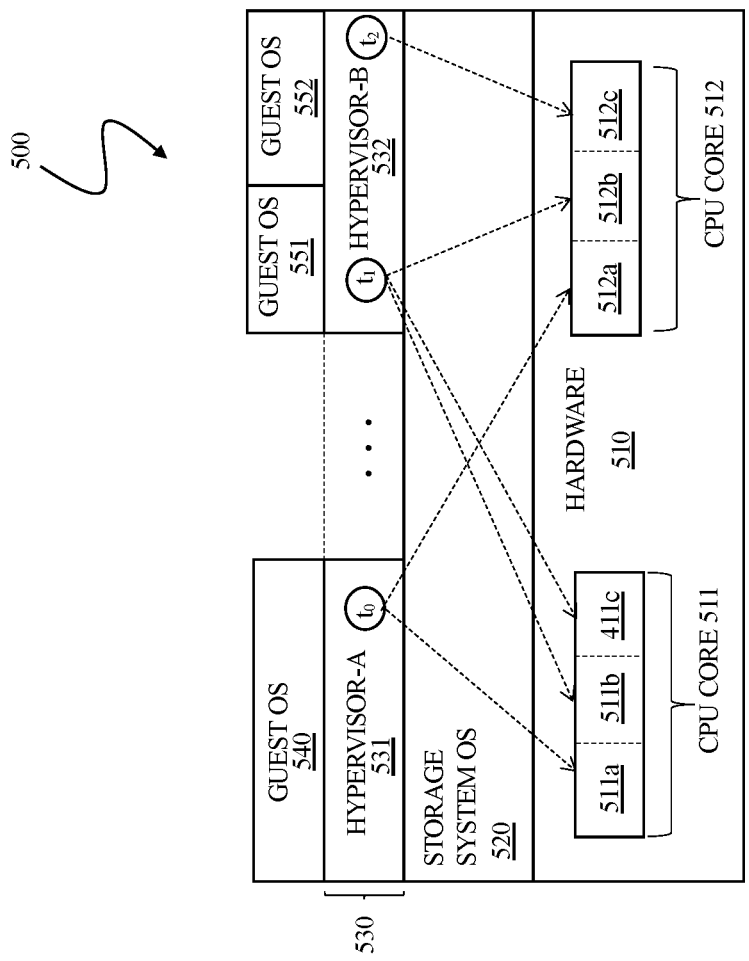
FIG. 7 is a schematic illustration showing a storage system with fractional SMP capabilities extended to one or more guest operating systems according to an embodiment of the system described herein.

Referring to FIG. 7, a schematic illustration shows a storage system 500 that is similar to the storage systems 100, 200 discussed elsewhere herein which may include a hardware layer 510 and a storage system OS layer 520. The storage system 500 has fractional SMP capabilities extended to one or more Guest OS's 540, 551, 552 according to an embodiment of the system described herein. The storage system 500 includes a container hypervisor layer 530, with a container hypervisor 531 (hypervisor-A) and a container hypervisor 532 (hypervisor-B) illustrated by way of example. The Guest OS's 540, 551 and 552 may be loaded using the container hypervisors 531, 532. The container hypervisors 531, 532 map virtual CPU cores to the physical CPU cores 511, 512 of the hardware layer 510. That is, in accordance with the system described herein, the one or more Guest OS's may only have access to a different number of available CPU cores (virtual CPU cores) that are available as physical CPU cores on the hardware 510. Through the use of the container hypervisors 531, 532 running as storage system OS threads t0, t1, and t2 (rather than being scheduled as storage system OS instances), at least one embodiment of the system described herein provides for the ability to schedule fractions of CPU time on multiple cores for one or more of the Guest OS's 540, 551, 552 according to the scheduling algorithms of the storage system OS components (e.g., Symm/K).

The scheduling of fractional CPU time on the physical CPU cores 511, 512 is shown schematically as fractions 511a-c and 512a-c of each of the CPU cores 511, 512. Each of the threads t0, t1, and t2 of the container hypervisors 531, 532 may operate in an SMP regime on multiple ones of the cores 511, 512 while allowing others of the threads to also operate with full CPU core resources. The system described herein provides for flexible control of physical CPU allocation between Guest OS's 540, 551, 552 without causing one or more of the Guest OS's 540, 551, 552 to become inactive due to resource overlaps. In this way, the Guest OS's 540, 551, 552 may run based on the threads of the container hypervisors 531, 532 using varying amounts of CPU time per CPU core in an SMP regime.

Consistent with other discussion herein, in at least one embodiment, different data services performed by the data storage system may be performed by applications, processes, or more generally, code, that execute in a Guest OS in a virtualized software environment. Each single data service may be performed by one or more threads of a container hypervisor. Multiple data services may simultaneously perform different functions. Each of the hypervisors and the base OS of a storage system may schedule and run one or more threads performing processing for one or more data services that utilize resources of the storage system, including use of the CPU resources such as CPU cores of the system. Additionally, the resource requirements of the data services may be dynamic and may vary over time.

In at least one embodiment, the data storage system may include multiple data services or applications that execute simultaneously. The data services may include I/O related services for processing I/O operations received at the data storage system. For example, the I/O related services may include block I/O data services, such as performed by a block storage server, and/or file I/O data services, such as performed by a file server. The I/O related services may include reading data from and/or writing data to the backend PDs in connection with servicing the received I/O operations.

In at least one embodiment of a data storage system, a single director board (e.g., 212a) or a single computing module (e.g., 220a) may be as described elsewhere herein in connection with the FIGS. 2A and 2B. In such an embodiment, each single board may have its CPUs configured with multiple directors, such as FAs, DAs, EDSs (extended service adapters), an RA, and the like. In some embodiments, the directors on each board may be emulated instances of directors, for example, provided by executing code on CPUs in a virtualized environment as described above that emulates or simulates the directors using code that executes in the context of a virtual machine (VM). Each such emulated director instance on a board may be configured, for example, to have one or more dedicated CPUs or CPU cores for executing code of the particular director to perform processing by the director. In a virtualized environment, one or more VMs may run or execute within the context of an emulated director such as an FA. One or more applications, such as performing data services, may be hosted in a VM that executes the particular operating system used by the application. For example, a file server running on a Linux operating system may execute in the context of a VM in an FA emulation instance.

A virtual local area network (VLAN) is a logical group of workstations, servers and network devices that appear to be on the same LAN. A VLAN allows a network of computers and users to communicate in a simulated environment as if they exist in a single LAN and are sharing a single broadcast and multicast domain. A VLAN typically exists at layer 2, the data link layer, of the OSI model. In at least one embodiment, there are multiple types of virtual network interfaces or devices (also sometimes referred to simply as virtual interfaces or devices) in Linux, such as, for example, MACvLAN, IPvLAN, and Bond interfaces or devices. Linux network drivers, such as MACvLAN, IPvLAN and Bond drivers, directly expose underlay interfaces or devices directly to VMs, containers, or more generally, virtualized entities of a VLAN or virtual network.

The underlay network includes physical interfaces or devices and also virtual interfaces or virtual devices created on top of the physical interfaces or devices that can be consumed by an application directly. The overlay network is created on top of the underlay network for software scalability and encapsulation of network packets for multiple services, typically in a docker environment.

MACvLAN and IPVLAN are Linux network drivers that expose the underlay or interfaces directly to other VMs or containers that may execute in a system, such as a host or a data storage system. Generally, there are two ways or approaches in which VMs or containers, such as VMs of the data storage system and host, may communicate with one another. With an underlay approach, the VMs or containers of the data storage system are directly exposed to the network, such as to the switch or more generally the SAN fabric. MACvLAN and IPVLAN are examples of such network drivers that use the underlay approach. In contrast, there is the overlay approach where there is an additional level of encapsulation between the container or VM and the underlay network.

With MACvLAN, the virtual interface or device is directly visible on a network channel, such as to a switch of the network connecting a host and the data storage system. With MACvLAN, each virtual interface or device receives a unique MAC (media access control) address and a unique IP (internet protocol) address, whereby the virtual interface or device is exposed directly in the underlay network, such as directly to the switch connecting a data storage system and a host. A MACvLAN interface or device of a VM or container on the data storage system may thus be directly exposed or accessible to a network connecting the data storage system to a data storage system client such as, for example, another VM executing on a host. In such a case, the host, or VM executing on the host, may access the MACvLAN interface or device over the network using the unique MAC address or the unique IP address.

Network bonding, such as provided using a bond interface or device, is a process of combining or joining two or more network interfaces together into a single logical interface. Network bonding offers performance improvements and redundancy by increasing the network throughput and bandwidth. The foregoing can be achieved using fail safe networking and link aggregation available network bonding techniques. With fail safe networking (FSN), if one interface of a bond device or interface is down or unplugged the configured backup (Active-backup) interface or device will work. Thus, FSN with bonding or with a bond device may be used in situations, for example, where there is a need for fault tolerance, redundancy or load balancing within networks. In Linux, a special kernel module named bonding may be used to connect multiple network interfaces into a single interface. Two or more network devices can be connected into a single logical "bonded" interface or device.

In at least one embodiment, a bond device may be configured in one of multiple supported modes in which the bonded pair of interfaces or devices operates. For example, the bond device may be configured to operate in a first mode for FSN. FSN noted above is based on Active-backup devices. With the FSN mode configured for a bond device, only one device of the bonded devices is active, and another device of the bonded devices will act only when the other fails. When configured to operate in the FSN mode, the MAC address of the bond device may be the MAC address of one of the bonded devices. In at least one embodiment, the MAC address of the bond device may be the same as that of the device added first in time into the bond device. At a point in time, if the active device of the bond device fails, a backup device of the bond device may take over as the new active device thus facilitating fault tolerance in cases like cable problems, port problems, or other hardware problems.

In at least one embodiment, the bond device may also be configured to operate in a second mode providing link aggregation. Link aggregation (LAG) allows for combining multiple Ethernet links into a single logical link between two networked devices. LAG offers the following benefits:
1. Increased reliability and availability. If one of the physical links in the LAG goes down, traffic is dynamically and transparently reassigned to one of the other physical links.
2. Better use of physical resources. Traffic can be load-balanced across the physical links.
3. Increased bandwidth. The aggregated physical links deliver higher bandwidth than each individual link.
4. Cost effectiveness. A physical network upgrade can be expensive, especially if it requires new cable runs. Link aggregation increases bandwidth without requiring new equipment.

In at least one embodiment, the LAG mode of a bond device may be a dynamic LAG mode that uses the Link Aggregation Control Protocol (LACP) to negotiate settings between the two connected devices.

In at least one embodiment, a file server, such as a NAS (Network Attached Storage) server, may provide file level data storage services to various hosts or other data storage system clients. The file server, such as the NAS server instance, may execute as an application within a VM on the data storage system, where the VM further executes within an FA emulation as discussed herein.

In at least one embodiment, the NAS server may be exposed over a network to a host or other data storage system client using a virtual interface or device. In such an embodiment, the NAS server's virtual interface or device may be a MACvLAN interface or device. The MACvLAN device or interface may be attached to, bound to, or generally associated with, the NAS file server. Additionally, the MACvLAN device may be further attached to, bound to or generally associated with, either a bond interface or device, or a physical interface or device. In an embodiment in which the MACvLAN device or interface is created on top of a bond interface or device, the bond interface or device may be used to provide FSN and/or dynamic LAG. Exposing the NAS file server over the network using a MACvLAN interface or device allows a client, such as the host, to directly access the NAS server over the network using the MAC address or the IP address of the NAS server, such as when the host sends I/Os or other communications to the NAS server. The foregoing provides a point to point communication which helps the host or other client to directly access the NAS server using a MAC address associated with the MACvLAN interface or device. MACvLAN is a virtual interface directly visible in the network channel, such as using the switch or network fabric, and provides better visibility in the network over other virtual interfaces or devices, such as those using IPVLAN. With IPVLAN, additional processing is required from the MAC/IP layer such as when routing communications from a host to an IPVLAN interface or device since the IPVLAN interface or device is not directly visible or accessible in the network channel using a MAC address.

The foregoing and other aspects of the techniques herein are described in more detail in the following paragraphs.

As noted elsewhere herein, storage systems may provide file-level services to host systems, for example, by providing one or more file-level (as opposed to block-level) servers over a network. Such servers include NAS servers, for example, Dell EMC™ Unity™ storage systems made available by EMC Corporation ("Dell EMC") of Hopkinton, Mass. In some cases, a storage system may provide file servers (e.g., NAS servers) in addition to block-level services. For example, a PowerMax™ storage systems made available from EMC Corporation ("Dell EMC") provides block-level storage services and may provide a virtualized platform on which one or more file servers may be implemented, for example, one or more embedded NAS (eNAS) servers.

Although the following description is provided using the eNAS or NAS file server, more generally, the techniques described herein may be applied for use with any suitable application, file server or data service, such as block I/O services.

FIG. 3 is a block diagram illustrating an example of a system 6300 for configuring a file server in an embodiment in accordance with the techniques herein. Other embodiments of a system for configuring a file server, for example, variations of system 6300, are possible and are intended to fall within the scope of the techniques herein. The system 6300 may be part of a storage network, for example, the storage network 10 or a variation thereof.

The system 6300 may include a storage system 6301, a network 6340, host systems 6344a-n, as well as other components. The storage system 6301 may be storage system 20a or a variation thereof, and may include storage processing modules 6302a-n (e.g., 212a-n). In some embodiments, the storage processing nodes 6302a-n may be director boards. The storage processing module 6302a may include one or more front-end (FE) slots 6326a-n, in which SLICs (small level interface cards) 6328a-n, respectively, may be installed. Each of the SLICs may include one or more ports (i.e., FE ports) that serve to couple the storage system 301 through the switch 6342 of the network 6340 to one or more host systems 6344a-n. For example, the SLIC 6328a may include FE ports 6329a1-an, and the SLIC 6328n may include FE ports 6329n1-nn.

The storage processing module 6302n may include one or more front-end (FE) slots 6336a-n, in which SLICs 6338a-n, respectively, may be installed. Each of the SLICs may include one or more ports (i.e., FE ports) that serve to couple the storage system 6301 through the switch 6342 of the network 340 to one or more host systems 6344a-n. For example, the SLIC 3638a may include FE ports 6339a1-an, and the SLIC 6338n may include FE ports 6339n1-nn.

Figure 8:
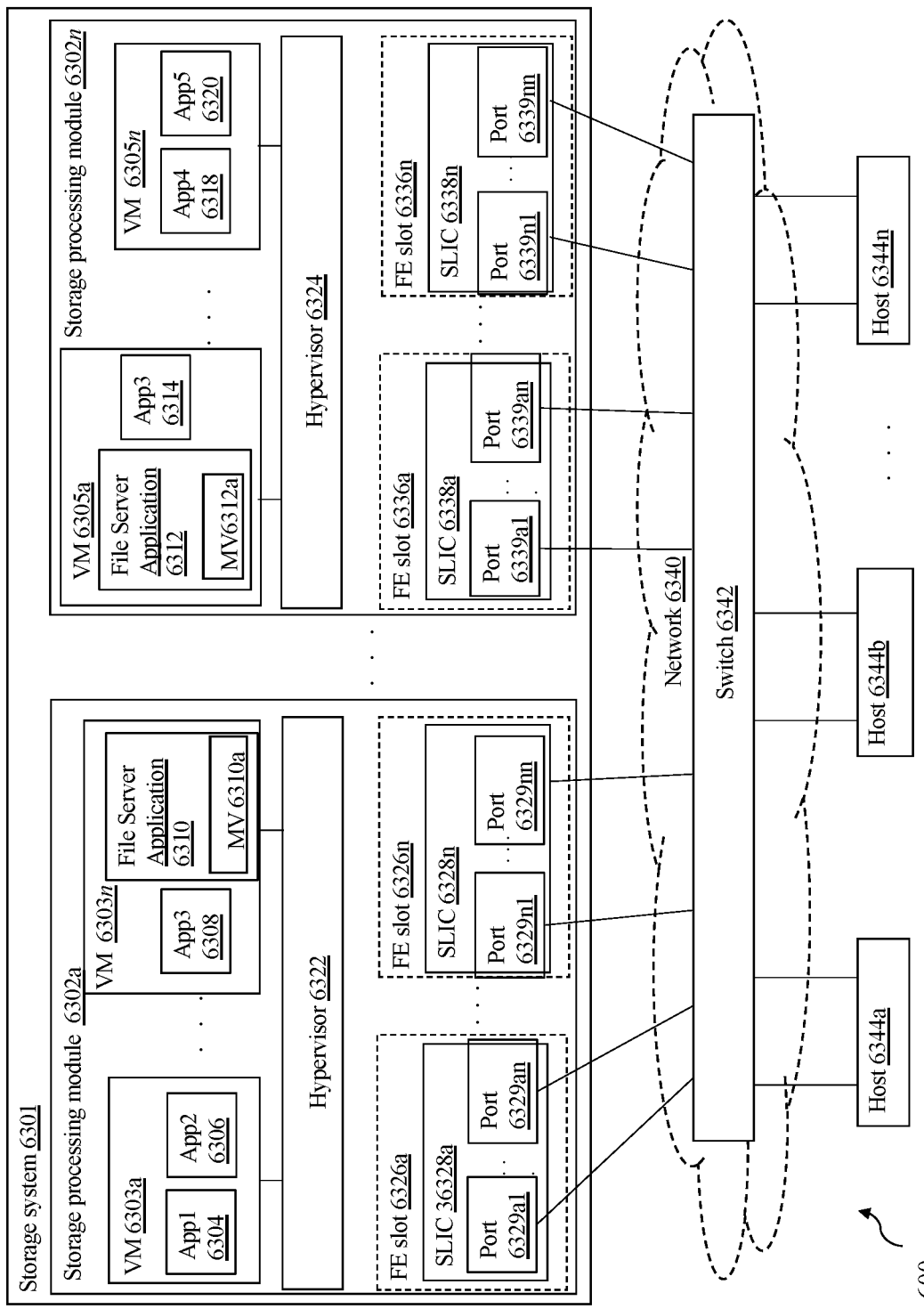
FIGS. 8 and 11 are examples illustrating a virtualized file server executing in the context of an emulated adapter or director in an embodiment in accordance with the techniques herein.

Each of the FE slots such as illustrated in the FIG. 8 may be characterized as a physical component of a storage system configured to physically receive an IO module that couples the storage system (typically through a network) to a host system. An IO module may include a network interface controller or card (NIC), such as a SLIC, that includes one or more physical ports that can be physically coupled to a physical link (e.g., electric or fiber optic cable) that connects, for example, to a switch of network between one or more host systems and the storage system.

Each of the storage processing modules may include a plurality of processing nodes, which may be implemented using software, firmware, or a suitable combination thereof. In some embodiments, the processing nodes may be implemented as VMs using virtualization software. For example, the storage processing module 6302a may include VMs 303a-n running (e.g., executing as threads) on hypervisor 6322; and the storage processing module 6302n may include VMs 6305a-n running (e.g., executing as threads) on hypervisor 6324. In some embodiments, the VMs 6303a-n and/or VMs 6305a-n may be guest operating systems (OSs) running on a storage hypervisor provided by a Hypermax™ OS of a PowerMax storage system.

One or more applications may run within each VM. For example, App1 6304 and App2 6306 may run within VM 6303a; App3 6308 and the file server application 6310 may run within the VM 6303n; the file server application 6312 and App3 6314 may run within the VM 6305a; and App4 6318 and App5 6320 may run within VM 6305n. In some embodiments, an I/O module (e.g., one of the SLICs 6328a-n and/or SLICs 6338a-n) may be associated with each VM.

The network 6340 is illustrated as including a single switch 6342. More generally, the network 6340 may include additional components coupled, directly or indirectly, to the switch 6342 where such additional components have been omitted for simplicity of illustration.

Consistent with other discussion herein, in at least one embodiment, the VMs 6303a-n may execute in the context of an emulated FA, and the VMs 6305a-n may also execute in the context of an emulated FA. In at least one embodiment, the file server applications 6310 and 6312 may include virtualized instances of eNAS file servers executing. The file server applications 6310 and 6312 may execute, respectively, as applications within the VMs 6303n, 6305a. In at least one embodiment, each of the file server applications 6310 and 6312 may include one or more eNAS file servers. Each eNAS server instance of 6310, 6312 may further host one or more file servers supporting one of more file system protocols. In at least one embodiment, each eNAS server instance may host one or more of the following file servers: CIFS (Common Internet File System) file server, NFS (Network File System) file server, and pNFS (Parallel NFS) file server.

Each eNAS server instance, such as included in the file server applications 6310 and 6312, may be visible or exposed to clients, such as the host 6344a-n, over the network 6340. As described in more detail in the following paragraphs, embodiments of the techniques herein utilize MACvLAN devices (MV) 6310a and 6312a. Each such MACvLAN device 6310a, 6312a may be bound or attached to a bond device (that is a network device) or a physical device (that is a network device) so that the eNAS server instances of the file server applications 6310, 6312 are directly visible to clients over the network 6340 using MAC addresses or IP addresses of the MACvLAN devices 6310a, 6312a. For example, the physical device may be an FE port such as port 6329a1. As another example, the bond device may be a logical bonding of two of the physical FE ports, such as FE ports 6329a1 and 6329a2. MACvLAN devices, bond devices and other details of the techniques herein are described in more detail in the following paragraphs.

As known in the art, the OSI (Open Systems Interconnect) Reference Model of networking or telecommunication includes the following 7 layers or levels, from the lowest (e.g., Level or layer 1) to the highest (Level or layer 7): physical, data link, network, transport, session, presentation, and application. TCP is a transport layer protocol that provides for reliable transmission of data in an IP environment. The transport layer corresponds to Layer 4 of the OSI Reference Model. The network layer corresponds to Layer 3 of the OSI Reference Model. The OSI reference model generally denotes the layers of a runtime stack that may be traversed, such as at a sending or receiving endpoint, in connection with sending and receiving data over a network.

A MAC address is a unique identifier assigned to a NIC for use as a network address in communications within a network segment. MAC addresses may be characterized as physical addresses and may be used to identify an endpoint, such as of a physical connection between systems, interfaces or components each having a particular MAC address. IP addresses may be characterized as logical network addresses assigned to devices through software configurations. Thus, an IP address assigned, bound or attached to a device or interface may be reconfigured or reassigned. In contrast, a MAC address is a physical address of a device or interface that is not reassigned or reconfigured. An IP address may be changed, for example, each time a device is connected to the network since the IP address may be dynamically allocated to the devices of the network. For example, a DHCP controller may allocate and assign IP addresses to devices in a network as such devices participate in the network.

A device or interface may thus have two types of addresses: a physical address denoted by the device or interface's MAC address, and an IP address. The MAC addresses are layer or level 2 addresses of the data link layer of the OSI Reference Model. In contrast, the IP addresses are layer or level 3 addresses of the network layer of the OSI Reference Model.

Both MAC addresses and IP addresses may be used to identify a network device or interface, but in different ways. A MAC address may be used for local identification and an IP address for global identification. For example, the MAC address may only have significance on the LAN or VLAN to which a device is connected, and it is not used or retained in the data stream once packets leave that LAN or VLAN. The IP address is used to transport data from one network to another network using the TCP/IP protocol. The MAC address may then be used to deliver the data to the correct receiving device on a network. For example, using IP addresses, internet routers move the packets from the source network to the destination network and then to the LAN on which the destination device is connected. That LAN then translates an IP address to a MAC address, adds the MAC address to the data packet and sends the data to the correct device having the MAC address. As described in more detail elsewhere herein, a MACvLAN device that is bound or attached to an NAS server may provide for exposing the NAS server instance directly on the network using both a MAC address and an IP address. In this manner, a client, such as a host, may directly send data or communications to the NAS server by specifying its MAC address in the communication. Using the MAC address of the MACvLAN device bound to the NAS server instance to send communications rather than the IP address of the MACvLAN device bound to the NAS server instance provides for performance improvements. For example, the communications transmitted to the NAS server exposed using the MAC address provide for omitting additional processing that would otherwise be performed if the communications are sent from a client specifying an IP address associated with another virtual device, such as an IPvLAN device, attached to the NAS server. The additional processing performed using an IPvLAN device in contrast to a MACvLAN device is described in more detail in following paragraphs.

Figure 9:
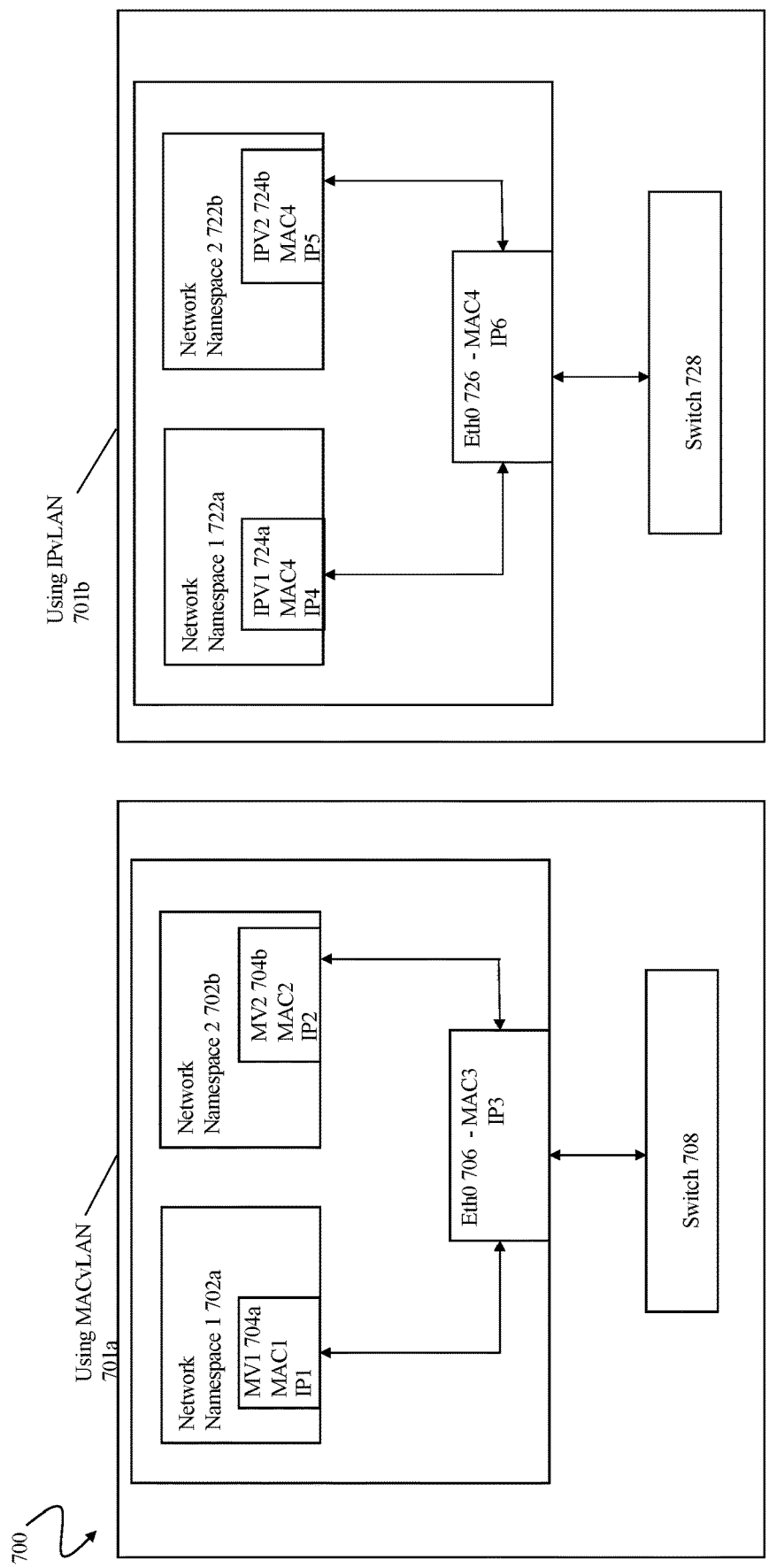
FIG. 9 is an example illustrating use of MACvLAN virtual network devices in an embodiment in accordance with the techniques herein and also illustrating use of IPvLAN virtual network devices.

Referring to FIG. 9, shown is an example 700 illustrating configuration of virtual devices using MACvLAN and IPvLAN.

The example 701a illustrates configuring virtual devices using MACvLAN in an embodiment in accordance with the techniques herein. Generally, MACvLAN may be used to create or configure virtual MACvLAN network devices to share a single physical device, such as an FE port of the data storage system, among multiple applications, nodes or namespaces of the data storage system.

The example 701a includes network namespaces 702a-b, switch 708, MACvLAN virtual devices 704a-b and physical device Eth0 706. The physical device Eth0 706 may be, for example, an Ethernet port such as an FE port of the data storage system. The MACvLAN network virtual device driver may be used to create one or more MACvLAN virtual devices (MVs), such as MVs 704a-b, that are bound to (e.g., attached or linked to, or more generally associated with) a physical device, such as Eth0 706. MACvLAN allows for configuring multiple data link layer 2 (i.e. Ethernet MAC) MAC addresses on a single physical device. MACvLAN allows a single physical device to have multiple MAC and IP addresses using MACvLAN sub interfaces. Each sub interface may have a unique MAC address and a unique IP address different from those of other sub interfaces of the same parent physical device. Each sub interface is assigned a unique MAC address and a unique IP address, where the unique MAC address and the unique IP address of the sub interface are exposed directly in the underlay network, and thus to the switch or other components of the underlay network. With MACvLAN, a physical device, such as Eth0 706, may be bound directly to a namespace, such as each of the namespaces 702a-b.

Each of the namespaces 702a-b may be a network namespace that is logically another copy of the network stack, with its own routes, firewall rules, and network devices. In at least one embodiment, each of the namespaces 702a-b may be bound to a single node or a single VM. As a variation in at least one embodiment, each of the namespaces 702a-b may be bound to a single application, such as a single instance of a file server application, where the file server application may further host or include one or more file servers, such as one or more NAS or eNAS file servers. More generally, each of the namespaces 702a-b may be associated with a different application instance, where each such application instance includes one or more NAS or eNAS file servers.

In the example 701a in an embodiment in accordance with the techniques herein, the physical device 706 has the MAC address MAC3 and has the IP address IP3. The MACvLAN network device driver may be used to configure the MACvLAN virtual network device MV1 704a that is bound to (e.g., attached or linked to, or more generally associated with) to the network namespace 702a with a first sub interface having the MAC address MAC1 and the IP address IP1. The MACvLAN network device driver may be used to configure the MACvLAN virtual network device MV2 704b that is bound to (e.g., attached or linked to, or more generally associated with) the network namespace 702b with a second sub interface having the MAC address MAC2 and the IP address IP2. In the example 701a, the 3 MAC addresses MAC1, MAC2 and MAC3, respectively, of the virtual device 704a, the virtual device 704b and the physical device 706 may be used to connect or expose the virtual device 704a, the virtual device 704b and the physical device 706 directly to the switch 708 (or more generally to the network including the switch 708). A host may also connect to the switch 708 and send communications directly to any of 704a, 704b and 706 using the MAC addresses, respectively, MAC1, MAC2 and MAC3. Thus, the MACvLAN driver may be used to assign a different MAC address to a different virtual network device of each container, VM, or other namespace, whereby each such virtual network device appears as a physical network device (e.g., Ethernet port) directly connected to the physical network.

The example 701a illustrates configuring virtual devices using MACvLAN in an embodiment in accordance with the techniques herein. Generally, MACvLAN may be used to create or configure virtual MACvLAN network devices to share a single physical device, such as an FE port of the data storage system, among multiple applications, nodes or namespaces of the data storage system.

The example 701b includes network namespaces 722a-b, switch 708, IPvLAN virtual devices 724a-b and physical device Eth0 726. The physical device Eth0 726 may be, for example, an Ethernet port such as an FE port of the data storage system. The IPvLAN network virtual device driver may be used to create one or more IPvLAN virtual devices (IPVs), such as IPVs 724a-b, that are bound to (e.g., attached or linked to, or more generally associated with) a physical device, such as Eth0 726. IPvLAN allows for configuring multiple IP addresses on a single physical device. With IPvLAN, the physical address and the one or more virtual devices bound to the physical device have the same MAC address with each having a different IP address. With IPvLAN, a physical device, such as Eth0 726, may be bound directly to a namespace, such as each of the namespaces 722a-b.

Each of the namespaces 722a-b may be a network namespace as discussed in connection with 701a. In the example 701b, the physical device 726 has the MAC address MAC4 and has the IP address IP6. The IPvLAN network device driver may be used to configure the IPvLAN virtual network device IPV1 724a that is bound to (e.g., attached or linked to, or more generally associated with) to the network namespace 722a having the MAC address MAC4 and the IP address IP4. The IPvLAN network device driver may be used to configure the IPvLAN virtual network device IPV2 724b that is bound to (e.g., attached or linked to, or more generally associated with) the network namespace 722b having the MAC address MAC4 and the IP address IP5. In the example 701a, the 3 IP addresses IP4, IP5, and IP6, respectively, of the virtual device 724a, the virtual device 724b and the physical device 726 may be used to connect or expose the virtual device 724a, the virtual device 724b and the physical device 726 directly to the switch 728 (or more generally to the network including the switch 728). A host may also connect to the switch 728 and send communications directly to any of 724a, 724b and 726 using the IP addresses, respectively, IP4, IP5 and IP6.

In connection with the example 701b, an incoming data packet from the switch 728 e reaches the physical device eth0 726, and then the physical device eth0 726 routes the data packet to the appropriate virtual device based on the IP address. Thus, the physical device 726 performs additional processing at the network or IP layer to map or route an IP address of a received data packet to an appropriate namespace (e.g., node, VM or application bound to the namespace) based on the IP address in the data packet matching the IP address of the IPvLAN virtual device of one of the namespaces.

As noted above in connection with the example 701a, with MACvLAN, each virtual device has a separate unique MAC address. The physical device eth0 706 and each MACvLAN virtual device 704a-b has its own unique MAC address. The physical device eth0 706 and each MACvLAN virtual device 704a-b is exposed in the underlay network and thus on the external network. In particular the MACvLAN virtual devices 704a-b of the namespaces 702a-b are directly exposed on the external network using their respective MACvLAN sub interfaces. In this manner, the unique IP address and the unique MAC address of the physical device 706 and each of the MACvLAN virtual devices 704a-b are known on the switch 708, or more generally, the external network including the switch 708. Other nodes and clients, such hosts, external to the data storage system may communicate directly to a first node, application, or VM bound to a particular one of the namespaces 704a-b using the IP address or the MAC address of the MACvLAN virtual device bound to the particular one of the namespaces 704a-b.

Consistent with other discussion above, MACvLAN virtual devices as illustrated in 701a can be accessed directly by an external client on the network using the IP address or the MAC address of the MACvLAN virtual device. If the MAC address of the MACvLAN virtual device of a namespace is used by a client to send a data packet to a node, VM or application bound to the namespace, the data packet is received by the physical device eth0 706 and then sent by the physical device eth0 to the MACvLAN device having the MAC address. In this case, the physical device eth0 706 sends the packet to the appropriate node, VM or application without requiring the additional processing noted above (e.g., without having the physical device act as a router or bridge that maps the received IP address of data packet to an IP address bound to a particular virtual IPvLAN device of a namespace).

In contrast, to a MACvLAN device, an IPvLAN device is only accessible directly by an external client on the network using its IP address. However, a MACvLAN device is directly accessible to an external client on the network using its MAC address as well as its IP address. A client that communicates directly with a MACvLAN virtual device of a namespace by sending data packets to the MAC address bound to the MACvLAN virtual device has an advantage of requiring less overhead in comparison to sending data packets to an IP address bound to an IPvLAN virtual device.

Based on the above, an embodiment in accordance with the techniques herein may thus use a configuration as described in connection with the example 701a where a different MACvLAN device is associated with each file server application instance. The MAC address of each such MACvLAN device of a file server application is directly exposed on the switch or external network whereby a host can send data directly to a MAC address of a MACvLAN device associated with a particular file server application instance. In this case, the physical device bound to the MACvLAN device does not have to perform the additional processing discussed above to determine the particular MACvLAN device that should receive an incoming data packet.

Figure 10:
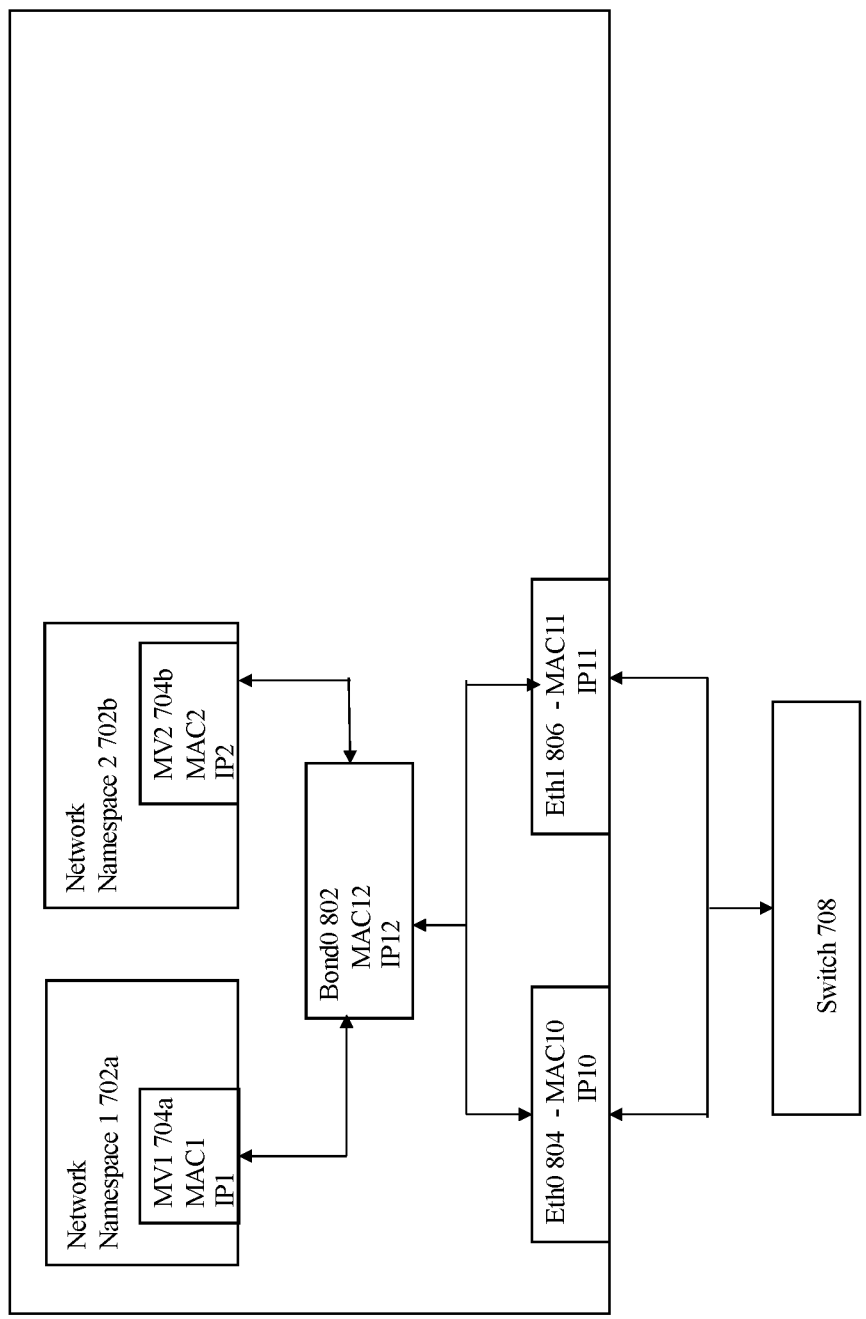
FIG. 10 is an example illustrating use of a bond device and MACvLAN virtual network devices in an embodiment in accordance with the techniques herein.

Referring to FIG. 10, shown is an example 800 illustrating a bond device in an embodiment in accordance with the techniques herein. The example 800 includes the switch 708, the network namespaces 702a-b and the MACvLAN virtual devices 704a-b as described above in connection with the element 701a of FIG. 9. Additionally, the example 800 includes the bond device 802 and the physical devices 804 and 806. The physical device 804 and 806 may be FE ports of the data storage system. The physical device 804 has the MAC address MAC10 and the IP address IP10, and the physical device 806 has the MAC address MAC11 and the IP address IP11.

In this example, the physical devices 804 and 806 may be combined or joined into a single logical device denoted by the bond device 802 having the MAC address MAC12 and the IP address IP12. Once the bond device 802 is configured, the MACvLAN virtual devices 704a-b may be configured on top of the bond device 802, whereby the MACvLAN devices 704a-b are bound to (e.g., linked or attached to, or associated with) the bond device 802. In this particular example 800, when the bond device 802 is configured for FSN mode where the physical device eth0 804 is the first physical device added (in time) to the bond device 802, the bond device 802 may then acquire the MAC address (MAC10) of the physical device 804. It should be noted that the particular MAC address and IP address of the bond device 802 may vary with the particular mode in which the bond device is configured. For example, as a variation, an embodiment in accordance with the techniques herein may use a bond device configured to operate using dynamic LAG.

It should be noted that although the bond device of FIG. 10 is illustrated as a logical combination or joining of physical devices, more generally, the bond device may be a logical combination or joining of multiple devices, where the multiple devices may be virtual or physical.

At least one embodiment in accordance with the techniques herein may utilize the configuration as described in connection with the element 701*a* of FIG. 9 whereby a MACvLAN virtual device associated with a file server application is configured on top of a physical network device, such as an FE port so that a host or other external client can directly access the MACvLAN device, and thus the file server application, using either the MAC address or the IP address bound to the MACvLAN device. The foregoing provides a point to point communication which allows clients to directly access the one or more NAS servers of the file server application, or more generally, access the NAS objects of the file server application associated with the MACvLAN device.

At least one embodiment in accordance with the techniques herein may utilize the configuration as described in connection with FIG. 10 whereby a MACvLAN virtual device associated with a file server application is configured on top of a bond device, where the bond device is a logical representation of multiple physical devices, such as multiple FE ports, so that a host or other external client can directly access the MACvLAN device, and thus the NAS servers of the file server application, using either the MAC address or the IP address bound to the MACvLAN device. The foregoing provides a point to point communication which allows clients to directly access the NAS server, or more generally, the NAS object, of the file server application that is associated with the MACvLAN device.

Figure 11:
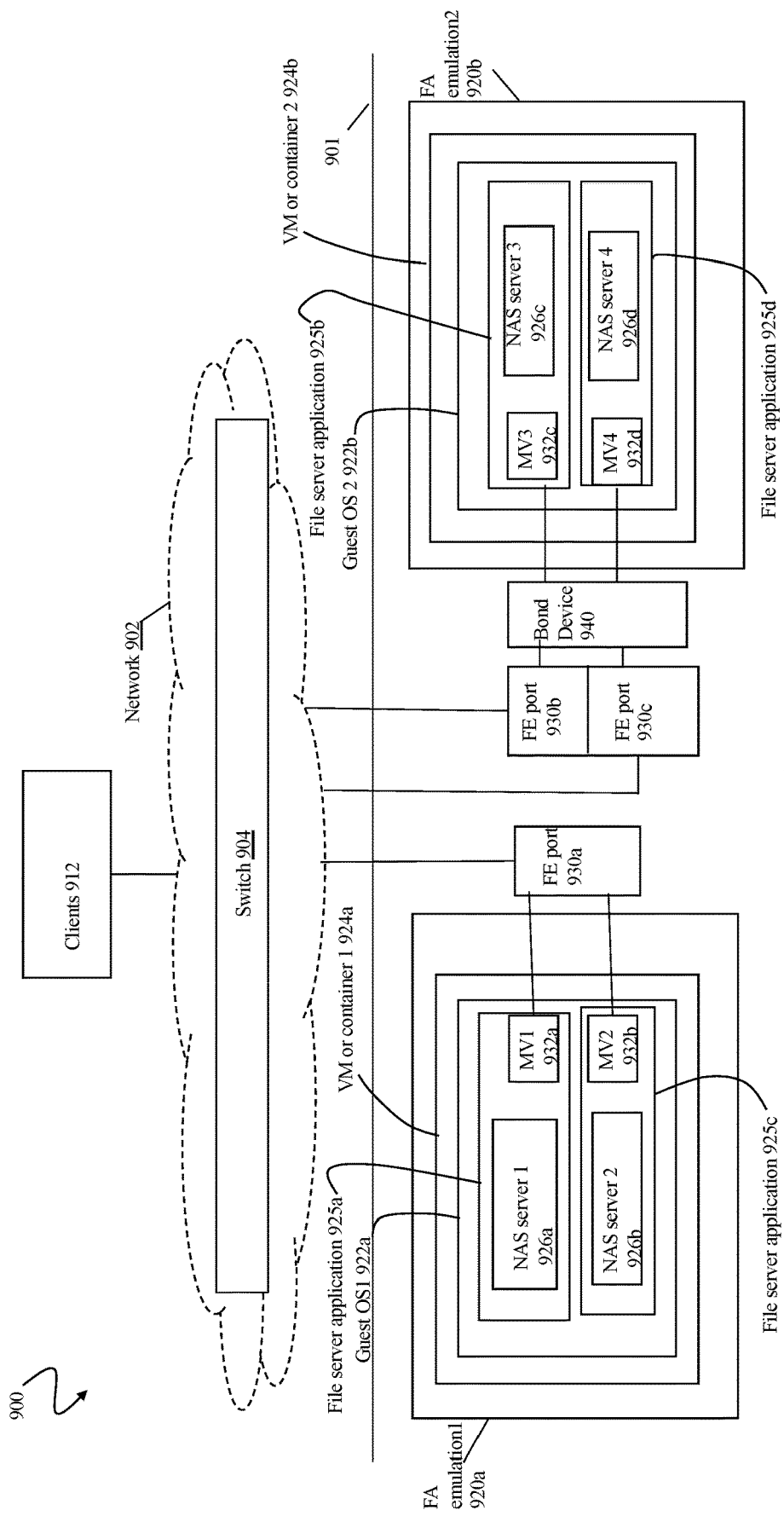

Referring to FIG. 11, shown is another example 900 illustrating a system and network in an embodiment in accordance with the techniques herein. The example 900 includes the clients 912, the network 902 and the switch 904. The clients 912 may denote external data storage system clients such as one or more hosts as discussed elsewhere herein. The network 902 may include the switch 904 as well as other components omitted for simplicity of illustration. All components below the line 901 may denote components included in a data storage system connected to the network 902. The clients 912 may communicate with the data storage system over the network 902. Thus elements 912, 902, 904 and also the data storage system (denoted by components below the line 901) may be as discussed elsewhere herein. It should be noted that the data storage system may include other components besides those below the line 901, where such components are omitted for simplicity of illustration.

In this example 900, the data storage system includes the FA emulation 920*a* where the VM or container 924*a* executes within the context of the FA emulation 920*a*. The guest OS 922*a* executes within the VM or container 924*a*. The file server applications 925*a*, 925*c* may execute on the guest OS 922*a* of the VM or container 924*a*. The file server application 925*a* may further host or include the eNAS or NAS server 926*a*. The file server application 925*c* may further include or host the eNAS or NAS server 926*b*. More generally, the file server applications 925*a*, 925*c* may each host or include one or more eNAS or NAS servers. Consistent with other discussion herein, the file server application 925*a* may be bound or associated with a first network namespace. Attached to the file server application 925*a* and its network namespace is the MACvLAN virtual network device MV1 932*a*. In this example, the MACvLAN virtual network device MV1 932*a* may be attached to the file server application 925*a* and used to access one or more NAS objects, such as the NAS server 926*a*, of the file server application 925*a*. Additionally, the file server application 925*c* may be bound or associated with a second network namespace. Attached to the file server application 925*c* and its network namespace is the MACvLAN virtual network device MV2 932*b*. In this example, the MACvLAN virtual network device MV2 932*b* may be attached to the file server application 925*c* and used to access one or more NAS objects, such as the NAS server 926*b*, of the file server application 925*c*. In this example, the MACvLAN virtual network device MV1 932*a* may be attached to the file server application 925*a* and used to access one or more NAS objects, such as the NAS server 926*a* of the file server application 925*a*. The MACvLAN virtual network device MV2 932*b* may be attached to the file server application 925*c* and used to access one or more NAS objects, such as the NAS server 926*b* of the file server application 925*c*. The MACvLAN virtual network devices 932*a*, 932*b* may be bound to (e.g., attached or linked to, or more generally associated with) the FE port 930*a*, where the FE port 930*a* is a physical network device. As discussed in more detail above, each of the virtual network devices 932*a*, 932*b* and also the physical device 930*a* may have different unique MAC addresses, where the MAC addresses of the devices 932*a*-*b* and 930*a* may be exposed directly to the network 902. In this manner, the clients 912 may directly communicate with the NAS server 926*a* using the unique MAC address of the MACvLAN device 932*a* bound to the file server application 925*a*. Additionally, the clients 912 may directly communicate with the NAS server 926*b* using the unique MAC address of the MACvLAN device 932*b* bound to the file server application 925*c*.

In this example 900, the data storage system includes the FA emulation 920*b* where the VM or container 924*b* executes within the context of the FA emulation 920*b*. The guest OS 922*b* executes within the VM or container 924*b*. The file server applications 925*b*, 925*d* may execute on the guest OS 922*b* of the VM or container 924*b*. The file server application 925*b* may further host or include the eNAS or NAS server 926*c*. The file server application 925*d* may further include or host the eNAS or NAS server 926*d*. More generally, the file server applications 925*b*, 925*d* may each host or include one or more eNAS or NAS servers. Consistent with other discussion herein, the file server application 925*b* may be bound or associated with a third network namespace. Attached to the file server application 925*b* and its network namespace is the MACvLAN virtual network device MV3 932*c*. In this example, the MACvLAN virtual network device MV3 932*c* may be attached to the file server application 925*b* and used to access one or more NAS objects, such as the NAS server 926*c*, of the file server application 925*b*. Additionally, the file server application 925*d* may be bound or associated with a fourth network namespace. Attached to the file server application 925*d* and its network namespace is the MACvLAN virtual network device MV4 932*d*. In this example, the MACvLAN virtual network device MV4 932*d* may be attached to the file server application 925*d* and used to access one or more NAS objects, such as the NAS server 926*d*, of the file server application 925*d*. The MACvLAN virtual network devices 932*c*, 932*d* may be bound to (e.g., attached or linked to, or more generally associated with) the bond device 940. The bond device 940 may include bonded physical network devices or FE ports 930*b*-*c*. As discussed in more detail above, each of the virtual network devices 932*c*, 932*d* and also the physical devices 930*c*-*d* may have different unique MAC addresses, where the MAC addresses of the devices 932*c*-*d* and 930*b*-*c* may be exposed directly to the network 902. In this manner, the clients 912 may directly communicate with the NAS server 926*c* using the unique MAC address of the MACvLAN device 932*c* bound to the file server application 925*b*. Additionally, the clients 912 may directly communicate with the NAS server 926*d* using the unique MAC address of the MACvLAN device 932*d* bound to the file server application 925*d*.

Figure 12:
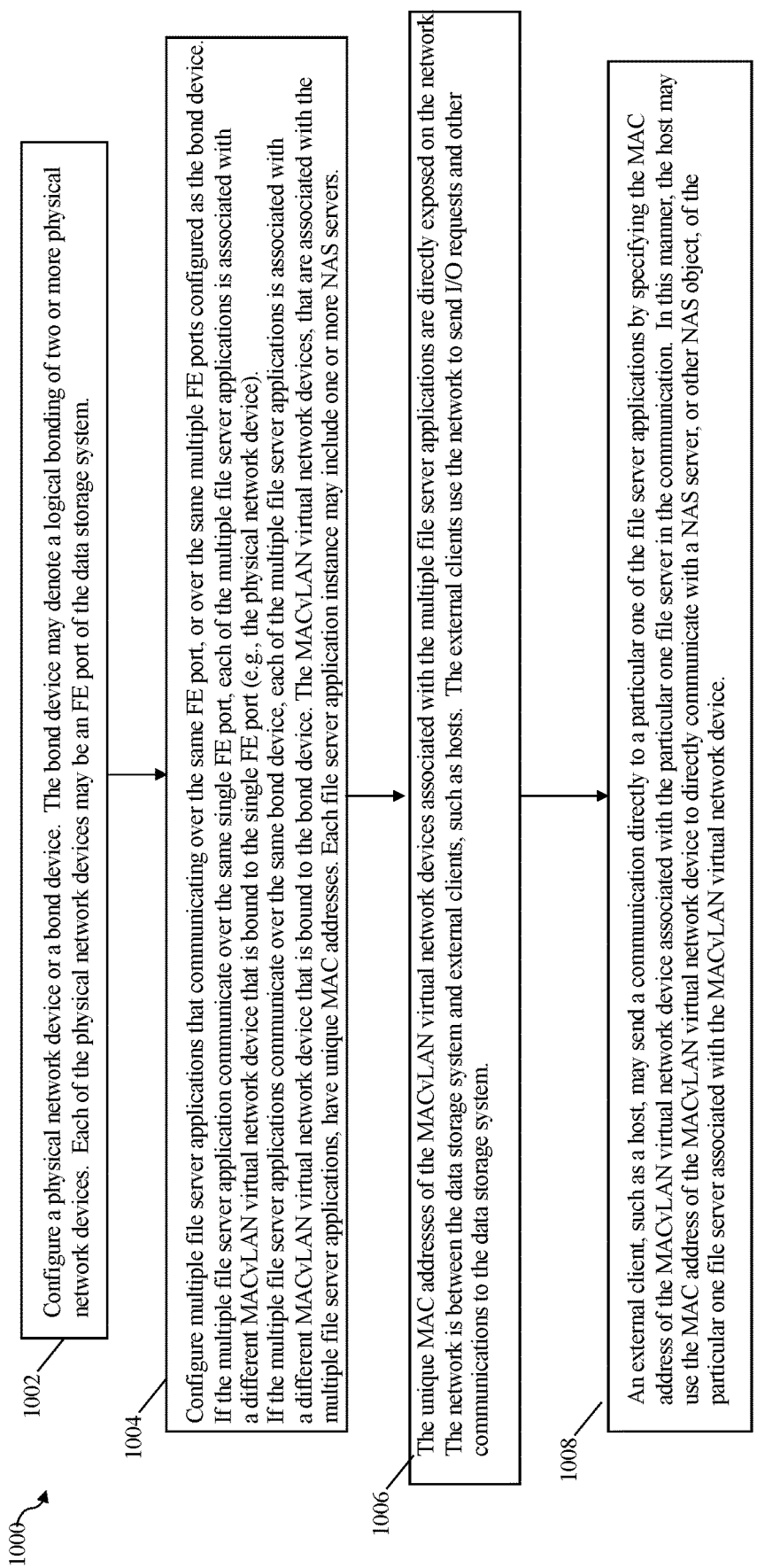

Referring to FIG. 12, shown is a flowchart 1000 of processing steps that may be performed in an embodiment in accordance with the techniques herein. The flowchart 1000 summarizes processing described above.

At the step 1002, processing may be performed to configure a physical network device or a bond device. The bond device may denote a logical bonding of two or more physical network devices. Each of the physical network devices may be an FE port of the data storage system. From the step 1002, control proceeds to the step 1004.

At the step 1004, processing may be performed to configure multiple file server applications that communicating over the same FE port, or over the same multiple FE ports configured as the bond device. If the multiple file server application communicate over the same single FE port, each of the multiple file server applications is associated with a different MACvLAN virtual network device that is bound to the single FE port (e.g., the physical network device). If the multiple file server applications communicate over the same bond device, each of the multiple file server applications is associated with a different MACvLAN virtual network device that is bound to the bond device. The MACvLAN virtual network devices, that are associated with the multiple file server applications, have unique MAC addresses. Each file server application instance may include one or more NAS servers. From the step 1004, control proceeds to the step 1006.

At the step 1006, the unique MAC addresses of the MACvLAN virtual network devices associated with the multiple file server applications are directly exposed on the network. The network is between the data storage system and external clients, such as hosts. The external clients use the network to send I/O requests and other communications to the data storage system. From the step 1006, control proceeds to the step 1008.

At the step 1008, an external client, such as a host, may send a communication directly to a particular one of the file server applications by specifying the MAC address of the MACvLAN virtual network device associated with the particular one file server in the communication. In this manner, the host may use the MAC address of the MACvLAN virtual network device to directly communicate with a NAS server, or other NAS object, of the particular one file server associated with the MACvLAN virtual network device.

It should be appreciated that while the steps are described herein as being performed serially and in a certain order, one or more these steps or portions thereof, may be performed concurrently and/or in a different order than illustrated and as described herein.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

What is claimed is:

1. A method of providing client interfaces comprising:
configuring a plurality of file server applications that communicate over a network using a shared network device that is a second network device having a first unique MAC (media access control) address and including at least one front end (FE) port of a data storage system, wherein said configuring includes:
associating each of the plurality of file server applications with a different one of a plurality of virtual network devices, wherein each of the plurality of virtual network devices is bound to a different one of a plurality of unique MAC addresses; and
binding the plurality of virtual network devices to the second network device so that the second network device has a first plurality of addresses including the first unique MAC address and the plurality of unique MAC addresses, wherein said binding includes:
configuring the second network device with a plurality of sub-interfaces; and
assigning each of the plurality of sub-interfaces of the second network device one of the plurality of unique MAC addresses of a corresponding one of the plurality of virtual network devices associated with one of the plurality of file server applications; and
exposing, using the plurality of sub-interfaces of the second network device, the plurality of unique MAC addresses of the plurality of virtual network devices directly to a data link layer component on the network, wherein each of the plurality of virtual network devices having one of the plurality of unique MAC addresses exposes an associated one of the plurality of file server applications directly on the network to one or more clients so that the associated one of the plurality of file server applications appears as a physical network device directly connected to the network.

2. The method of claim 1, wherein the data link layer component is a switch.

3. The method of claim 1, wherein the data storage system sends and receives communications over the FE port.

4. The method of claim 1, wherein the second network device is a bond network device representing a plurality of physical network devices that are logically bonded as the bond network device, and wherein the plurality of physical network devices of the bond device include the at least one FE port of the data storage system.

5. The method of claim 4, wherein each of the plurality of physical network devices of the bond network device is a different FE port of the data storage system, and wherein the different FE port is connected to the network that is external with respect to the data storage system.

6. The method of claim 1, wherein the one or more clients are connected to the network and communicate with the data storage system over the network, and wherein the data storage system includes the plurality of file server applications, the plurality of virtual network devices, and the second device.

7. The method of claim 6, wherein the one or more clients include a host, and the method includes:
sending, over the network, a first message from the host to a first file server application of the plurality of file server applications, wherein the first message includes a first physical MAC address of the plurality of unique physical MAC addresses, where the first physical MAC address is bound to a first of the plurality of virtual network devices associated with the first file server application of the plurality of file servers;

responsive to said sending the first message to the first file server application, receiving the first communication at the second device of the data storage system; and responsive to receiving the first message at the second device, sending the first message from the second device to the first virtual network device that has the first physical MAC address and that is associated with the first file server application.

8. The method of claim 1, wherein at least the first file server application includes one or more NAS (network attached storage) servers each supporting a plurality of file system protocols.

9. The method of claim 8, wherein each of the one or more NAS servers includes a plurality of file servers supporting the plurality of file system protocols.

10. The method of claim 9, wherein the plurality of file servers includes a CIFS (Common Internet File System) file server, an NFS (Network File System) file server, and a pNFS (Parallel NFS) file server.

11. The method of claim 10, wherein the plurality of file server applications run on a plurality of processing nodes.

12. The method of claim 11, wherein the plurality of processing nodes are a plurality of virtual machines, and wherein the plurality of file server applications are emulated virtualized instances executing in a context of the plurality of virtual machines.

13. The method of claim 9, wherein each of the one or more NAS servers is an emulated NAS server executing as a virtualized instance in a context of a virtual machine.

14. The method of claim 1, wherein the plurality of unique MAC addresses are utilized at a data link layer of a network or telecommunications runtime stack.

15. The method of claim 4, wherein the bond network device is configured in a fail safe networking mode.

16. The method of claim 4, wherein the bond device is configured in a link aggregation mode.

17. A system comprising:
at least one processor; and
at least one memory comprising code stored thereon that, when executed, performs a method of providing client interfaces comprising:
configuring a plurality of file server applications that communicate over a network using a shared network device that is a second network device having a first unique MAC (media access control) address and including at least one front end (FE) port of a data storage system, wherein said configuring includes:
associating each of the plurality of file server applications with a different one of a plurality of virtual network devices, wherein each of the plurality of virtual network devices is bound to a different one of a plurality of unique MAC addresses; and
binding the plurality of virtual network devices to the second network device so that the second network device has a first plurality of addresses including the first unique MAC address and the plurality of unique MAC addresses, wherein said binding includes:
configuring the second network device with a plurality of sub-interfaces; and
assigning each of the plurality of sub-interfaces of the second network device one of the plurality of unique I MAC addresses of a corresponding one of the plurality of virtual network devices associated with one of the plurality of file server applications; and exposing, using the plurality of sub-interfaces of the second network device, the plurality of unique MAC addresses of the plurality of virtual network devices directly to a data link layer component on the network, wherein each of the plurality of virtual network devices having one of the plurality of unique MAC addresses exposes an associated one of the plurality of file server applications directly on the network to one or more clients so that the associated one of the plurality of file server applications appears as a physical network device directly connected to the network.

18. The system of claim 17, wherein the data link layer component is a switch.

19. A non-transitory computer readable medium comprising code stored thereon that, when executed, performs a method of providing client interfaces comprising:
configuring a plurality of file server applications that communicate over a network using a shared network device that is a second network device having a first unique MAC (media access control) address and including at least one front end (FE) port of a data storage system, wherein said configuring includes:
associating each of the plurality of file server applications with a different one of a plurality of virtual network devices, wherein each of the plurality of virtual network devices is bound to a different one of a plurality of unique MAC addresses; and
binding the plurality of virtual network devices to the second network device so that the second network device has a first plurality of addresses including the first unique MAC address and the plurality of unique MAC addresses, wherein said binding includes:
configuring the second network device with a plurality of sub-interfaces; and
assigning each of the plurality of sub-interfaces of the second network device one of the plurality of unique MAC addresses of a corresponding one of the plurality of virtual network devices associated with one of the plurality of file server applications; and exposing, using the plurality of sub-interfaces of the second network device, the plurality of unique MAC addresses of the plurality of virtual network devices directly to a data link layer component on the network, wherein each of the plurality of virtual network devices having one of the plurality of unique MAC addresses exposes an associated one of the plurality of file server applications directly on the network to one or more clients so that the associated one of the plurality of file server applications appears as a physical network device directly connected to the network.

20. The non-transitory computer readable medium of claim 19, wherein the data link layer component is a switch.

* * * * *

UNITED STATES PATENT AND TRADEMARK OFFICE
CERTIFICATE OF CORRECTION

PATENT NO. : 11,481,356 B2
APPLICATION NO. : 16/934171
DATED : July 21, 2020
INVENTOR(S) : Maneesh Singhal et al.

It is certified that error appears in the above-identified patent and that said Letters Patent is hereby corrected as shown below:

In the Claims

Column 29, Line 23:
In Claim 10, the phrase "servers includes a CIF S" should read -- servers includes a CIFS --

Signed and Sealed this
Twentieth Day of December, 2022

Katherine Kelly Vidal
*Director of the United States Patent and Trademark Office*